Dec. 2, 1958  C. STAMOS ET AL  2,862,607
SUSPENSION IDLER
Filed Aug. 28, 1953  2 Sheets-Sheet 1
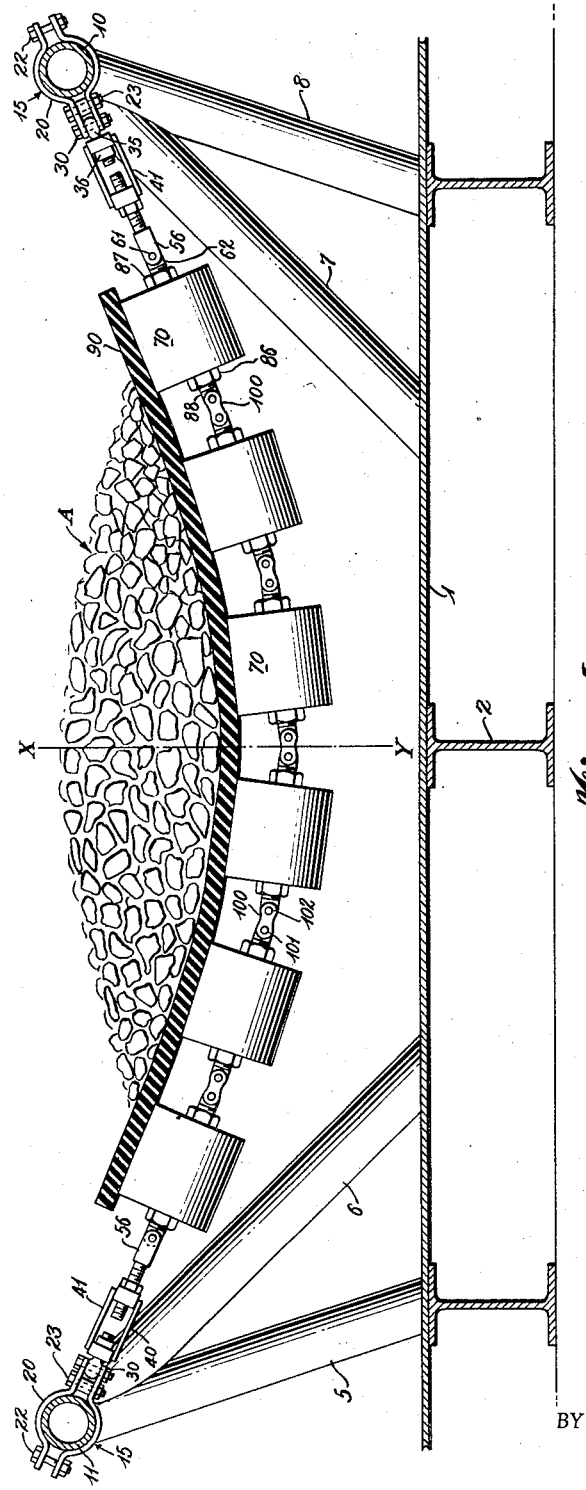
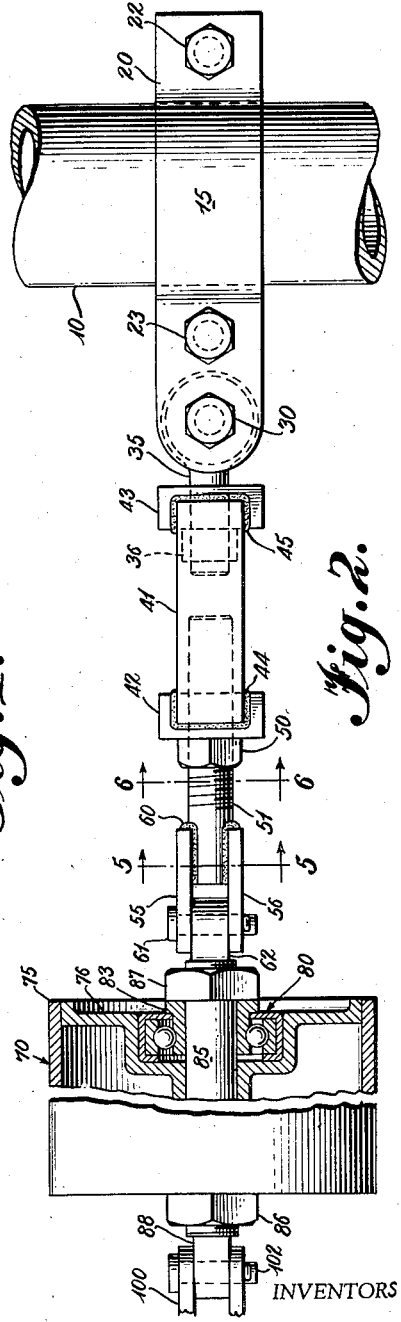
INVENTORS
John J. Huey and
Chris Stamos
BY Sidney W. Russell
ATTORNEY

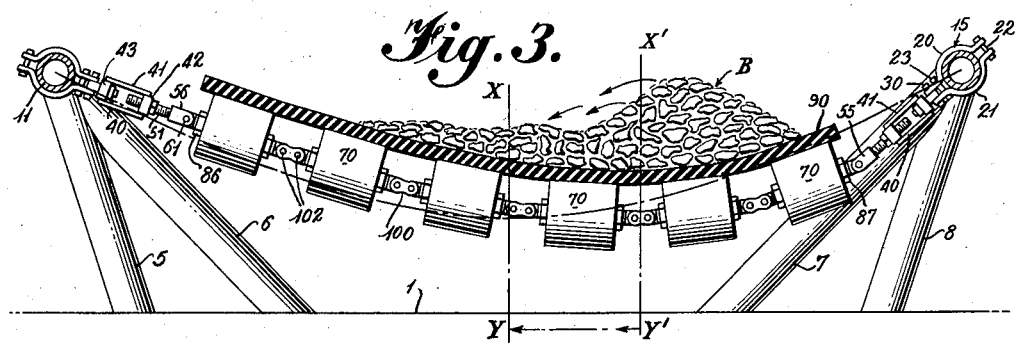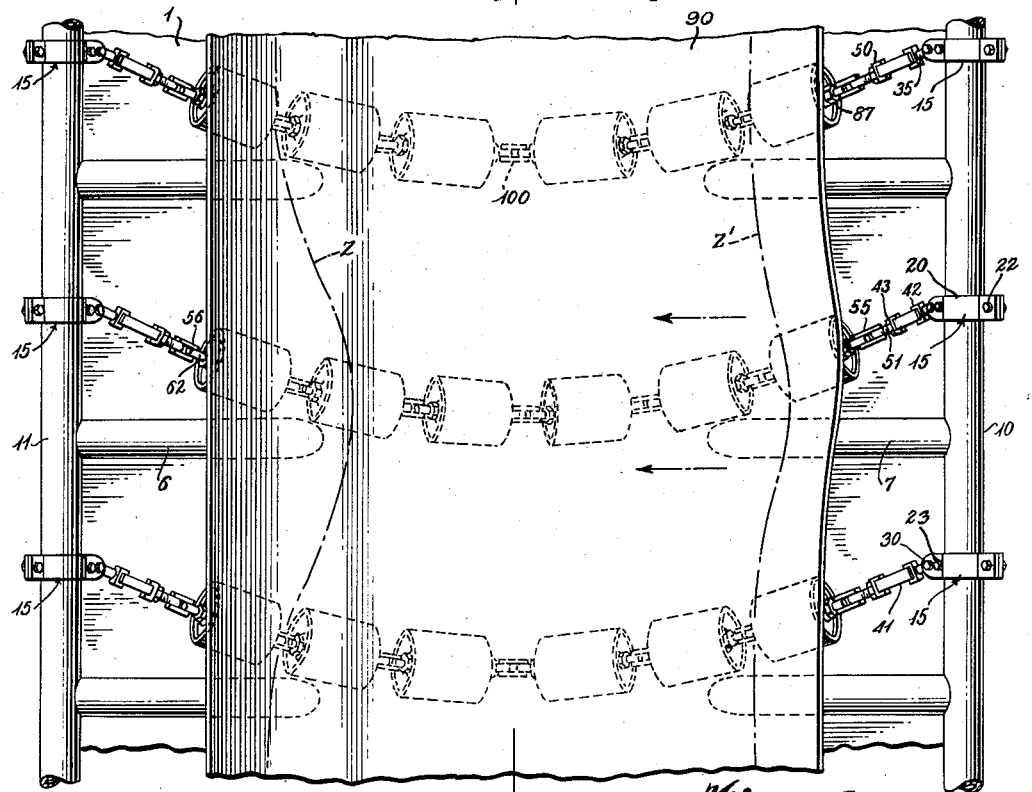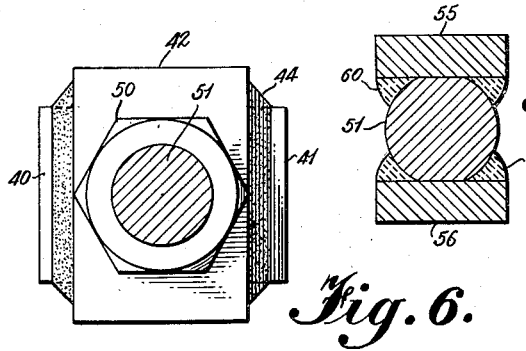

United States Patent Office
2,862,607
Patented Dec. 2, 1958

2,862,607
SUSPENSION IDLER

Chris Stamos, Chicago, and John J. Huey, Elmhurst, Ill., assignors to The United Electric Coal Companies, Chicago, Ill., a corporation of Delaware Application August 28, 1953, Serial No. 377,175

2 Claims. (Cl. 198—192)

This invention relates to a belt conveyor system and more particularly, to highly flexible and resilient idler units to be used in conjunction with such system. Because of their relatively high degree of flexibility during high speed motion of conveyor belting which is used in, for example, coal or rock conveyor systems, the idler units of our invention provide a particularly useful structure which permits high speeds of travel of the belting but at the same time reduces, if not entirely eliminates, vibration, side sway or lateral deflection and as well, horizontal deflection in the line of travel. These deleterious effects, ordinarily present in devices of the prior art, introduce many practical complications, such as "pounding" and consequent wasteful overflow of the material sought to be conveyed.

Idler pulleys in belt conveyors have long been known. However, the common variety of idler known to the prior art has not heretofore been satisfactory because of those inherent disadvantages enumerated in the foregoing.

For example, at high speeds an idler suspension unit must be of such construction that "bumping" is avoided and lateral side sway or deflection is obviated. Previous devices have not suggested apparatus to achieve this desideratum. Such have been based upon the compression principle wherein the idlers are mounted in a stationary or inflexible manner. Such prohibits variation of the surface of the conveyor belting to accommodate displaced materials with a counterbalancing effect to force them back, when so displaced, to the center of the conveyor unit.

Systems which employ a single pivoted linkage between idlers, spring elements therebetween, or wire rope interconnecting links between idlers, are unsatisfactory and do not obtain the desired result. All of these have failed to achieve that degree of flexibility which is sufficient to permit the belting to assume a catenary curve, or curves of logarithmic function at high speeds, which tend to counterbalance unbalanced loads and return same to the center of the conveyor. A load in imbalance at points on the surface of the belting causes undue vibration, overloading and consequent spillage of the material conveyed. Such is common to devices of the prior art. A significant and critical factor in the present invention therefore, is the use of a multiple pivot connection between idler rolls, as distinguished between, e. g., a single pivot or other relatively inflexible pivot therebetween. The latter are ineffective to obtain the functions and advantages to be hereinafter described. Although a double pivot is herein referred to, the term "multiple" pivot as used in this description is applicable to a double pivot but includes interconnecting pivot arrangements of three or more pivots.

The instant invention obviates the disadvantages enumerated in the foregoing by utilizing the principle of suspension instead of the principle of compression, for support of the conveyor belting. The invention contemplates the use of idlers, axially aligned on an extremely flexible supporting shaft in such manner that these units together form at all times, whether at rest or in motion, a catenary or logarithmic curve which appropriately rebounds from any condition of unbalanced load or temporary sag. Such conditions, occurring particularly during high rates of travel of the conveyor, are immediately corrected by the structure of our invention.

It is, accordingly, an object of the instant invention to provide a suspension idler which is the extreme in flexibility and which by the use of a multiple pin interconnection between idler rolls operates smoothly at high speed without "bump" or sidesway, promptly centering the load by taking advantage of the horizontal component of forces inherent in idlers suspended in catenary fashion.

It is a further object of our invention to provide an idler system whereby a series of transverse idler rolls is suspended to form a catenary curve, but which is adaptable to curves of varied logarithmic function dependent upon variables in speed and load. By this invention the temporary distortion of the conveyor belting due to load and speed is resisted to an ultimate degree, whereby material being conveyed is thrown back to the center of the conveyor belt when deflected and whereby, as stated, bumping at high speeds is substantially reduced.

A further object of the invention is to provide suspension idlers for conveyor belting which, in reducing the impact upon same which results from high speed and high load conditions, substantially reduces the element of repair and thereby, substantially diminishes overall maintenance expenses.

An additional object of this invention contemplates the provision of idler suspension rollers and the mountings therefor which reduce the overall weight of such systems to a minimum and which roll freely under any condition of lateral distortion or high speed operation.

Another object of the invention is to provide what we term a micrometer adjustment for the suspended idlers in order that fine adjustments to fit the series of idlers to the desired conveyor belting, and to obtain the desired catenary curve within precise limits, may be made after the entire assembly is in operative position and even during high speed operation of the system.

Other objects and advantages of our invention will be made apparent by the following description thereof. More particular reference is now made to the accompanying drawings illustrating the preferred embodiment of the invention, and in which:

Figure 1 is an elevation view of the invention, partly in section;

Figure 2 is an enlarged detail view, partly in section, illustrating the manner of pivotally mounting the end suspension means of each idler assembly;

Figure 3 is an elevation view similar to Figure 1, and partially in section, illustrating the manner in which the conveyed material in an off center position is forced back to the center of the conveyor belting by the nature of the suspension mounting and roller interconnection;

Figure 4 is a plan view of the invention as shown in Figure 3;

Figure 5 is a section view taken on the line 5—5 of Figure 2; and

Figure 6 is a section view taken on the line 6—6 of Figure 2.

Referring more particularly to the drawings, it will be seen that these idler units are mounted on some form of base member 1, which as herein shown is in turn supported on a series of I-beams 2. On the base member 1 are positioned two pairs of supports. For example, supports 5 and 6 extend angularly and outwardly with respect to the center line of the direction of movement of the conveyor system; and similarly, supports 7 and 8 extend to the same degree angularly and outwardly on the opposite side of the conveyor. Each pair of supports is suitably adjoined together at their respective upper ends as by welding or other common media, and as indicated in Figure 1. These two pairs of angular supports each accommodate frame members running at right angles thereto. Thus frame members 10 and 11, so mounted, and affixed to the respective pairs of supporting bars, as by welding or other common media, provide the structure from which each end of the individual rolls is positioned transverse to the direction of movement of the conveyor.

This suspension of the flexibly interconnected idlers is accomplished by providing a series of split collars or ring clamps 20 which encircle the frame members 10 and 11 at desired and predetermined points. These are spaced at desired intervals, dependent upon such factors as the size of the conveyor assembly as a whole and the nature of the use to which it is to be put. Such ring clamps are secured together at their outer sides by bolts 22 and at the inboard sides by bolts 23 all of which are inserted in suitable apertures through opposing halves of such collars, as will be readily understood. In addition, each ring clamp is provided with an additional inboard bolt 30, the latter providing support for a swivel 35. The function of the latter, when connected to each end of the idler assembly, is to permit deflection of each suspended series of idler rolls in the direction of travel of the conveyor belting, particularly at high speeds. Such swivels in fact form a component part of structure similar to that of a turnbuckle, and comprises apparatus which we have referred to in the foregoing as micrometer adjustment structure. This is more particularly referred to in the following.

It is to be appreciated that the pivot or swivel 35 permits unlimited horizontal movement or movement longitudinally in the plane of line of travel of the supported belt, but naturally inhibits or precludes any substantial amount of deflection vertically with respect to such plane in the line of travel of the belting. This is simply because the single pivot 30 is mounted with its axis substantially normal to a horizontal plane, and hence, cannot, by its very structure, be deflected substantially or appreciably in a vertical plane.

Each of the swivels 35 is threaded at its opposite end to accommodate the necessary retaining bolt 36 and also to accomodate between bolt 36 and the suspension means so far described, an end plate 43 which is connected by two opposing side plates 41 to an opposite end plate 42. These structural units, namely 41, 42 and 43, are welded together as at 44 and 45 to form a rectangular structure; i. e., the main body of this form of turnbuckle. Such welding is shown in more detail in Figure 6. The opposite end plate 42 is suitably bored, and provided with a nut 50 threaded to receive a shaft 51. The latter, by means of such adjusting nut 50, can be adjusted to the position shown in Figure 2 in dotted line, or extended or retracted with respect to side plates 41, thus providing each side of the series of suspended idler rolls with fine adjustment means to vary the depth of the catenary formed thereby and to assure full contact of all rolls with the belt surface. The shaft 51 is welded as indicated at 60 (Figure 5) to two additional side plates 55 and 56, secured as by a bolt 61 to a complementary spindle 62, the latter being a reduced end of the bearing shaft or arbor 85 for one of the end idler pulleys 70. As seen in Figure 2, the bolt 61 is cotterpinned in place. Shaft 62 and side plates 55 and 56 of this structure are therefore in pivoted relationship with respect to each other.

The means to vary the depth of the catenary, described in the foregoing, consists of the micrometer adjustment we have referred to in the objects of this invention. Provision for such an adjustment is an additional feature of the invention, as it is to be understood that even a small alteration in the length of each series of rollers may have a disturbing effect upon the high speed and effective operation thereof. For example, a variation of length of one of the series of idlers of even $1/64$ of an inch or less will substantially alter the depth of the catenary curve obtained and may produce a curve which is not within effective and desired limits. Also, even though made with relatively fine tolerances, such as .0005 of an inch, the series of interconnecting double pivots and the rolls supported thereby may not, when the desired curve is sought to be obtained, attain the most efficient catenary. Adjustment is then necessary. This micrometer adjustment may also be utilized to compensate for either normal wear or errors of manufacture in the supporting linkage for the idler rolls and related equipment. It is likewise a compensatory feature for stress upon the supporting frame supports 5, 6 7 and 8, while subject to speed and load, these may be forced inwardly by amounts sufficient to alter the shape of the catenary, and hence the micrometer adjustment is available to correct the curve in the desired amount while the assembly is operating and subject to such stresses. A further important consideration is that, having the desired curve in mind, the operator will find that relatively heavy conveyor beltings (such as the $3/4$ inch or even heavier type often found in commercial operations) will sometimes not precisely fit the curve of the rollers, so that one or more of the idlers does not fully share its proper proportion of weight or is not in constant contact with the belt, thus causing undesirable pounding during operation. This might be due to the natural resistance to distortion in such belting. Such inaccuracies would not be large, but the adjusting structure nevertheless enables extremely small and fine alterations so that within successful operating limits, enough regulation of the idlers is possible to cause each idler to contact its proportionate surface of belting and share its proportionate load. The over-all result of this adjusting means, therefore, is to make it possible to obtain the true and effective catenary, to accurately level a whole series of conveyor support assemblies; and hence to provide a smoother bump and shock resistant surface for the belt to travel upon.

Referring now to the structure of the rolls themselves, it will be seen that each of the idler rolls 70 may be provided with a flat rim 75 supported on an intermediate hub portion 76. The rolls are mounted for free rotation on arbors 85 and to this end, suitable ball or roller bearings 80 are provided.

Bearing surfaces for these ball bearing races are provided by units 86 and 87 which are threaded on each end of the arbor 85. As indicated in Figure 2, each of these units 86 and 87 is reduced in size at its inner end sufficiently to form a retaining flange 83. Thus, units or races 86 and 87 support the antifriction elements 80, the flanges 83 retaining such elements in position. Each of the idler rolls 70 is thus mounted for free and high speed rotational movement responsive to contact with the belting 90.

It is to be understood that the ball bearing races and accompanying structure just described is set forth herein for illustrative purposes only. Other types of antifriction elements, well known to those skilled in the art, may be utilized, so long as each idler is so mounted upon its respective stationary axis as to be capable of free rotation upon contact with the conveyor belt.

From the foregoing description it will be appreciated that all of the idler rolls are mounted in the same manner. Thus each is positioned for rotational movement upon arbors 85, the latter having a reduced spindle portion which is bored in the described manner for the insertion of connecting bolts such as earlier described at 61. In this way each of the idler rolls is interchangeable with another. Also, in the event of damage to any one of them, removal and replacement can be quickly and easily effectuated.

Reference will now be made to the manner of interconnection which is used in between each of the separate idler rollers 70. Although not complex, this feature is a critical one, the interconnection being made in such manner that, while extremely flexible, it is at the same time sufficient strong and durable to withstand industrial usage at extremely high speeds. It is not subject to inordinate wear as would be, for example, simply a resilient interconnecting spring, single pivot, wire rope or rubber mounting. The latter structures, to withstand industrial usage, must be of such disproportionate size as to be inflexible within the sense used herein. The desired catenary curve, here essential, can not by such means be obtained.

Accordingly, in our invention a multiple pivot interconnection is employed. This is preferably a double pivot although interconnections between idlers of three or more pivots, in the manner herein described, may be used in special circumstances. The double pivot has the characteristics of long life, extreme flexibility, and ability to form, be distorted from, and return to the desired catenary or logarithmic curve, with resultant utility outlined in the foregoing.

As stated, each of the separate idler rolls 70 terminates on each side in a reduced supporting shaft such as that referred to hereinbefore as spindle 62. As shown in Figure 2, the opposing spindle, also reduced in size from that of arbor 85, is indicated at 88. This too is bored to accommodate a suitable pivot pin 102 positioned in place by a cotterpin or other usual means. The said pivot pin 102 also engages two side plates 100, each of which must obviously be drilled to also accommodate pivot pins 101. When at rest, the side plates 100 are positioned in a plane normal to the horizontal. However, when the conveyor is operated at high speed, the pivots are twisted in the direction of movement thereof, the side plates then being deflected angularly accordingly.

These double pivots are clearly shown in Figure 1 where it must be appreciated that they support the conveyor element 90 in a completely flexible manner and in a way which would not be accomplished were there but a single connecting pin separating adjacent idler rolls. In substance, the double pivot affords a chain like effect to the series of rolls 70, so that unlimited deflection of one with respect to another is obtainable. Yet the curve of the supported element, conveyor belt 90, assumes a catenary shape which is distortable under stress, and which, when distorted by an unbalanced load, builds up those components of force necessary to return the load to the centerline. Although a single pivot under certain circumstances may approach a formation similar to the catenary, it is completely inflexible in the sense that imbalance due to load and speed would not materially change the shape thereof, so as to immediately bring into play these horizontal components of force which cause shifting of load to the centerline.

By reference to Figure 1, it is to be appreciated that when the series of rollers 70 are mounted as described in the foregoing, and separated by a flexible element consisting of a two pivot interconnection therebetween, the curve naturally assumed by the rolls and as here shown, is that of a catenary curve. Such a curve is well known mathematically and may be described alternatively as a curve of logarithmic function. It is seen that the conveyor belting 90 thus assumes this catenary shape, to be sharply distinguished from a curve formed on a constant radius.

In Figure 1, the extended parameter of the catenary curve there shown, and which is accomplished by the structure herein described, is indicated at X—Y. The parameter of such curve may be described as distance from the lowest point of the curve to the directrix, and hence the line X—Y indicates an extension vertically of this line.

When the load is in balance, such as, for example, the load of crushed material indicated at A, Figure 1, this curve is of the usual catenary type due to the double pivot interconnection spoken of in the foregoing.

Referring to Figure 3, the load on the conveyor element is indicated at B and shown to be out of balance or to one side of the conveyor with respect to the axis of movement thereof. Here the extended parameter, due to transfer of the catenary, has been moved an appreciable distance from the line X—Y and is now indicated at X'—Y'. Due to the double pivot connection the idler rolls are permitted to temporarily shift with the formation of a curve having the parameter X'—Y'. However, this shift is accompanied by a horizontal component of force on each link of the catenary.

Referring to Figure 4, the lines Z, Z' indicate the same load as shown in Figure 3, but out of balance. Also indicated is the stress or force exerted by the impulse of the catenary to return to its original position. This force is towards the center of the conveyor and indicated by the arrows in Figure 4.

Such force to return to the original position exerts a throwing impact towards the center of the conveyor belting. Consequently, as indicated by the arrows in Figure 3, the load temporarily out of balance is caused to immediately return to the center of the carrier.

The double pivot in between idler rollers 70, together with the pivotal connection 35 hereinbefore described, effectuates still another function. At high speeds the catenary obtained by the double pivot is maintained in plan as well as in section. For example, referring to Figure 4, it is seen that as high speed is attained, each series of idler rolls is thrown forward momentarily due to surges in the direction of movement of the conveyor, and the shape of the catenary is retained here also. Here again, the double pivot interconnection, making possible the use of a flexible suspension which takes the form of a catenary curve, creates forces opposing bumping during progress of the material conveyor.

As stated, the double pivot differs critically in structure and function from a single pivot interconnection or other interconnections which do not permit formation of the catenary, temporary distortion thereof, and return to original position with resultant centering action. Such are also lacking in utility by reason of their inordinate tendency to wear. Experimentation has shown that such methods of mounting a series of idler rollers as by spring means, wire rope, rubber components or single pivot, are utterly unsatisfactory to accomplish the objectives herein set forth. In all instances, either the catenary obtained is rigid to distortion, or if distortable, the means used are subject to inordinate wear and, therefore, completely lack utility.

It is to be appreciated that by the foregoing structure the depth of the catenary may be varied; this is accomplished by extending or retracting the series of suspended idlers through the turnbuckle structure. Such suspension is thus variable with respect to the frame members 10, 11 on each side of the assembly.

It is to be observed that in the preferred embodiment of the invention herein described and claimed, the double pivot interconnection is made at the axis of rotation of the idler rolls. Suspension in any other manner as by mounting the rolls separately and not upon the same shaft would not obtain the catenary or logarithmic curve herein described with its consequent ability to return an off balance load to the center of the conveyor belt.

Though this invention has been described with reference only to the single embodiment shown in the drawings, it is understood that variations thereof may be made without departing from the spirit or scope of the appended claims.

What is claimed is:

1. In an idler apparatus for a belt conveyor, opposed conveyor supporting means, a series of non-rotatable axes suspended between said means, a series of idler rolls mounted for free rotation on each of said axes, means to flexibly interconnect said rolls comprising a double pivot element joining adjacent of said axes, whereby said rolls may be suspended to form a distortable catenary curve, means to maintain said curve in plan and in section during movement of said conveyor, said last-named means including a pivot means adjacent each of said supporting means, and a micrometer adjustment means between each of said pivot means and each end of said series, whereby the depth and shape of said catenary may be varied.

2. In an idler apparatus for conveyor belting, opposed conveyor supporting means on each side of said conveyor belting, a series of non-rotatable axes suspended between said means, a series of idler rolls mounted for free rotation on each of said axes, flexible means to interconnect adjacent axes comprising a multiple pivot therebetween, said pivot having pivotal axes positioned substantially parallel to the direction of travel of said belting, means to permit said series of axes and idler rolls to move in the direction of movement of said conveyor belting, said means including a pivot element having an axis mounted in a plane approximately normal to said direction of travel of said belting, said series forming a distortable catenary curve during rest and motion of said conveyor, and means to adjust the depth of said curve in small increments, said last-named means being positioned between said support means and said ends, whereby the nature of said curve may be varied and material on said conveyor is maintained centrally thereof during high speed motion thereof.

References Cited in the file of this patent

UNITED STATES PATENTS

| | | |
|---|---|---|
| 909,833 | Vrooman | Jan. 12, 1909 |
| 993,701 | Messiter | May 30, 1911 |
| 1,255,659 | Stephens | Feb. 5, 1918 |
| 1,295,138 | Dull | Feb. 25, 1919 |
| 2,698,077 | Baechli | Dec. 28, 1954 |

FOREIGN PATENTS

| | | |
|---|---|---|
| 105,141 | Great Britain | Apr. 5, 1917 |
| 329,132 | Great Britain | May 15, 1930 |
| 890,337 | France | Nov. 2, 1943 |